No. 612,916. Patented Oct. 25, 1898.
C. SELLENSCHEIDT.
FILTER.
(Application filed Dec. 30, 1897.)

(No Model.)

Witnesses:—
Alfred Wrist
Heinrich Neulart

Inventor:—
Carl Sellenscheidt
by Eustace W. Hopkins
Att'y

UNITED STATES PATENT OFFICE.

CARL SELLENSCHEIDT, OF BERLIN, GERMANY.

FILTER.

SPECIFICATION forming part of Letters Patent No. 612,916, dated October 25, 1898.

Application filed December 30, 1897. Serial No. 664,775. (No model.)

*To all whom it may concern:*

Be it known that I, CARL SELLENSCHEIDT, a subject of the Emperor of Germany, and a resident of Berlin, Empire of Germany, have invented certain new and useful Improvements in Filters, of which the following is a full, clear, and exact description.

The present invention relates to filters; and it consists of the details of construction hereinafter described, and particularly pointed out in the claims, and in order to render the present specification more easily intelligible reference is had to the accompanying drawings, in which similar letters of reference denote similar parts throughout the several views.

Figure 1:
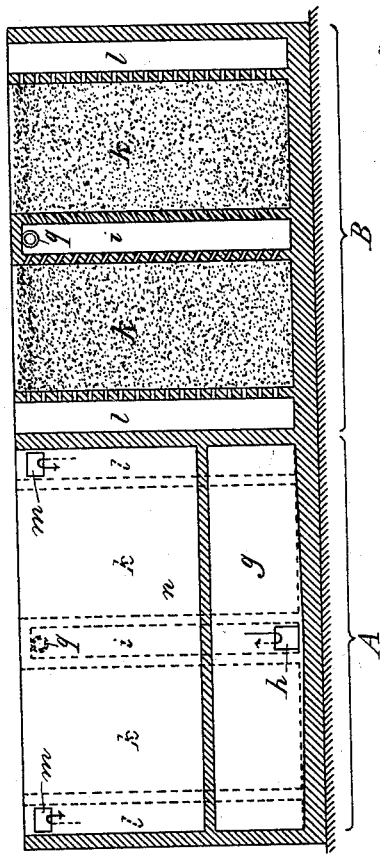
Figure 2:
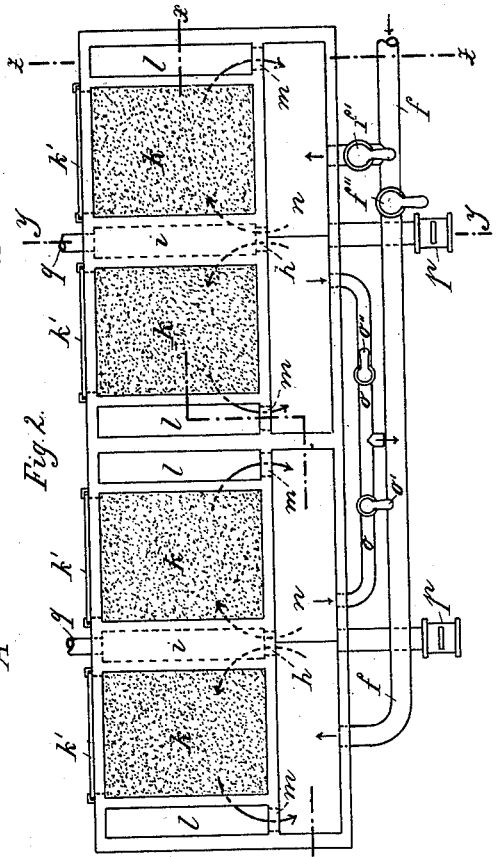
Figure 3:
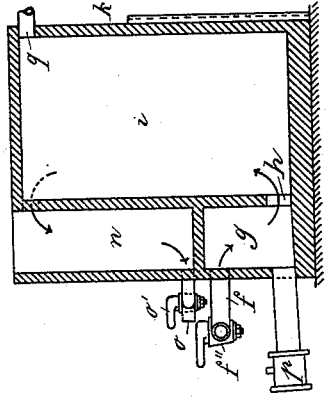

Figure 1 is a vertical section on line $xx$ of Fig. 2, which is a plan of the filter. Fig. 3 is a vertical transverse section on line $yy$ of Fig. 2, and Fig. 4 a similar section on line $zz$ of Fig. 2.

The filter illustrated is divided into two chambers, which may be employed separately or together, said chambers being marked A and B, respectively, but any number of chambers may be employed. Since all the chambers are constructed in a similar manner it will suffice for the purposes of the present specification to describe one only. The water passes along the inlet-pipe $f$, having cocks $f'$ and $f''$, by means of which the water may be fed to one or both chambers, according as the cocks are opened or closed, as will be evident from the drawings. The water passes into the entrance-chamber $g$, which extends throughout the entire length of the chamber, along the front part of the bottom of the same. From this chamber it passes through the lower openings $h$ into a distributing-chamber $i$, which extends upwardly between the two filtering-chambers $k$ $k$, in which the filtering material—gravel, sand, or the like—is arranged. The walls of the chamber $i$ are perforated with slanting holes, Fig. 1, for a purpose hereinafter set forth, but primarily to allow the water to pass into the filtering-chambers. The water now rises in these latter chambers, being properly filtered, and passes out of the same through their outer perforated walls into the collecting-chambers $l$ $l$, whence it flows through openings $m$ into the delivery-chamber $n$. This chamber is provided with an outlet-pipe $o$, having cock $o'$, by which means the water may be drawn off at will. The delivery-chambers $n$ of the two chambers A and B may be connected by the outlet-pipe $o$, having two cocks $o'$ and $o''$ and a suitable spout, so that by correspondingly manipulating the cocks water may be drawn off from one or the other or from both the chambers A and B, as will be evident.

Figure 4:
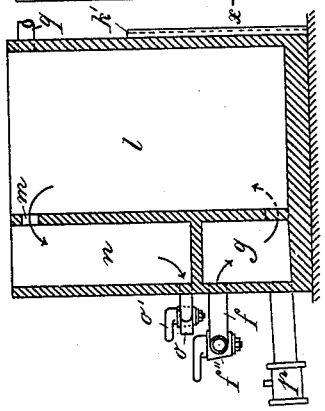

In order to cleanse the filtering-beds in the chambers $k$ $k$, an outlet $p$, Figs. 3 and 4, is provided at the bottom of the filter, and when the filter is full of water and the water-feed closed and also the outlet-cocks shut off the water in the filter will run back down through the slanting holes of the distributing-chamber walls and rinse out the filter-beds, passing through $h$ into the entrance-chamber $g$ and out at $p$.

The filter-chambers $k$ $k$ are provided at the back with tightly-fitting doors $k'$ $k'$, through which the said filtering material may be removed and new material substituted. An overflow-pipe $q$ is provided at the back of the upper part of the chambers $i$ $i$. These latter chambers should advantageously be covered, so as to afford the possibility of raising pressure in the filter-chambers when required. The other chambers $l$ and $n$ may be open, if desired.

I claim as my invention—

1. In a filter the combination of an entrance-chamber $g$ extending along the front lower part of the filter, a series of filter-chambers $k$ $k$ behind said entrance-chambers, distributing-chambers $i$ between said filter-chambers, having perforated walls, a delivery-chamber $n$ above said entrance-chamber, collecting-chambers $l$ $l$ at the outside of the filtering-chambers, and perforated walls to separate said collecting and filtering chambers, inlets $h$ from the entrance-chamber to the chambers $i$, and outlets $m$ from the chambers $l$ $l$ to the delivery-chamber $n$, and water-feed pipe to the entrance-chamber $g$ and outlet-pipe to the chamber $n$ substantially as described.

2. In a filter the combination of an entrance-chamber $g$ and a delivery-chamber thereabove, filter-chambers $k$ $k$ behind said entrance and delivery chambers, distributing-chamber $i$ having perforated walls to communicate with said filter-chambers, said perforations being slanted downwardly toward the chamber $i$, tightly-closing doors $k'$ to said filter-chambers, collecting-chambers $l\,l$ at the outside of said filter-chambers, having perforated walls to communicate with said filter-chambers, a delivery-chamber $n$ and communication between same and the chambers $l\,l$ and between the chamber $g$ and chamber $i$, water-feed pipe to chamber $g$ and outlet-pipe to chamber $n$ and a lower outlet-pipe $p$ in the manner and for the purpose substantially as described.

In testimony whereof I have signed my name to this specification in the presence of two subscribing witnesses.

CARL SELLENSCHEIDT.

Witnesses:
 RICHARD THELER,
 CHARLES H. DAY.